Sept. 6, 1927.  L. B. SPERRY  1,641,700
AIRCRAFT
Filed Oct. 21, 1922  4 Sheets-Sheet 1
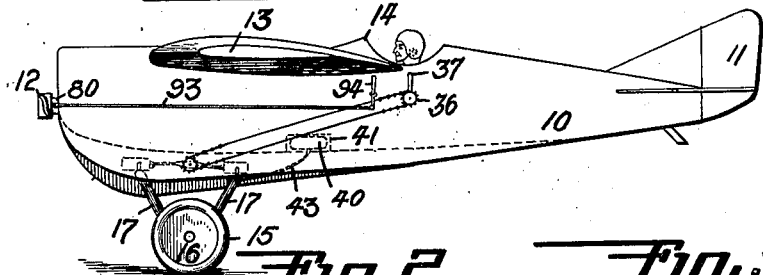
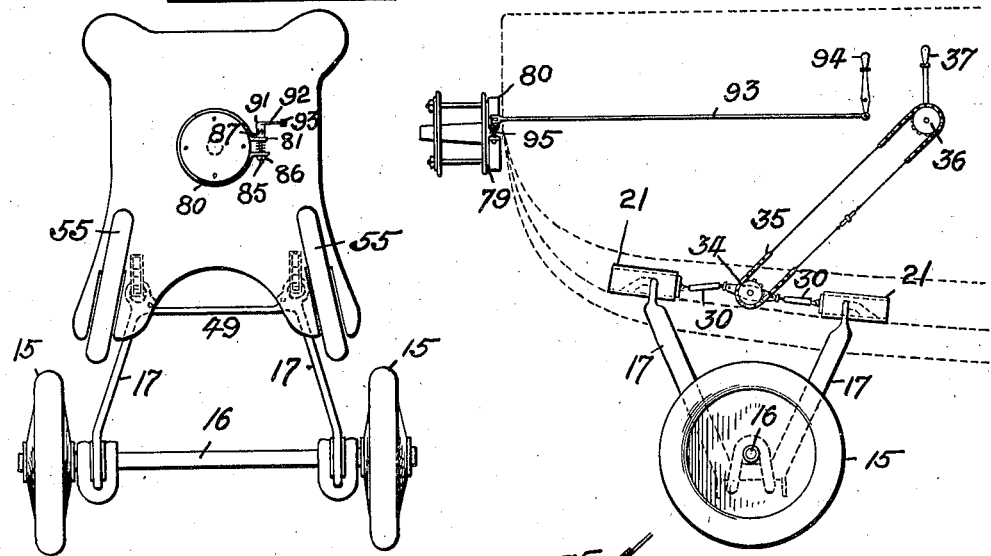
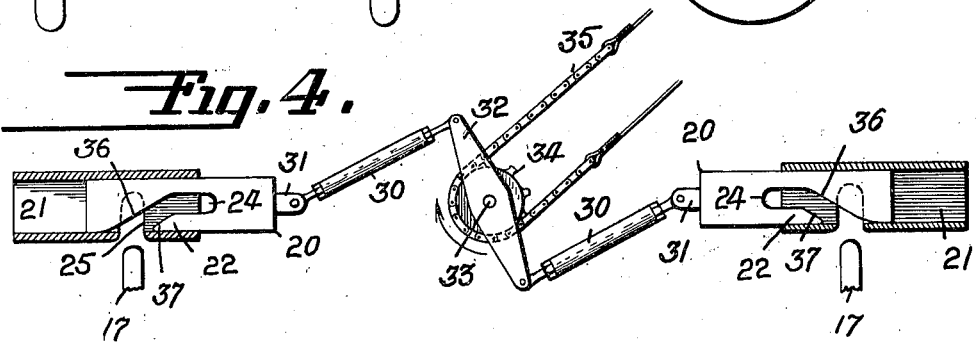
Inventor
LAWRENCE B. SPERRY.
By his Attorney
Herbert H. Thompson

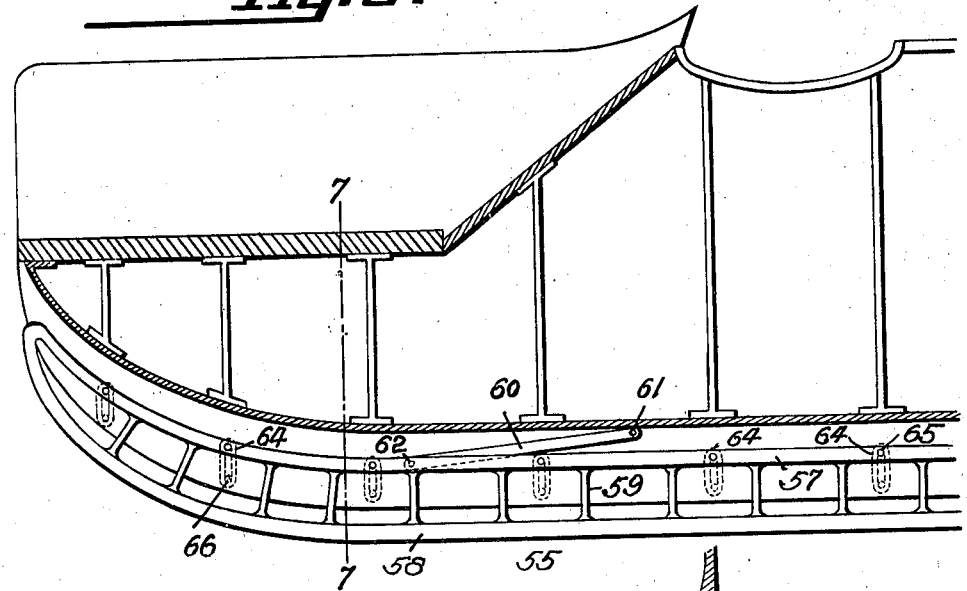
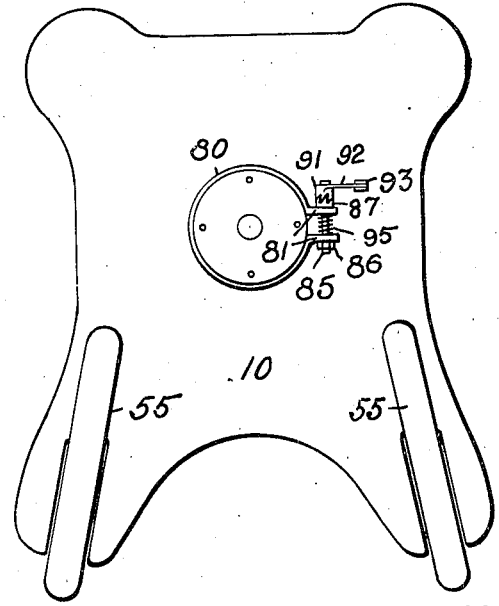
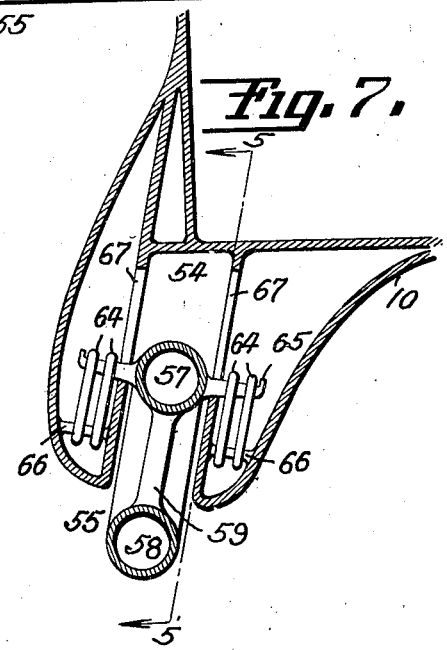

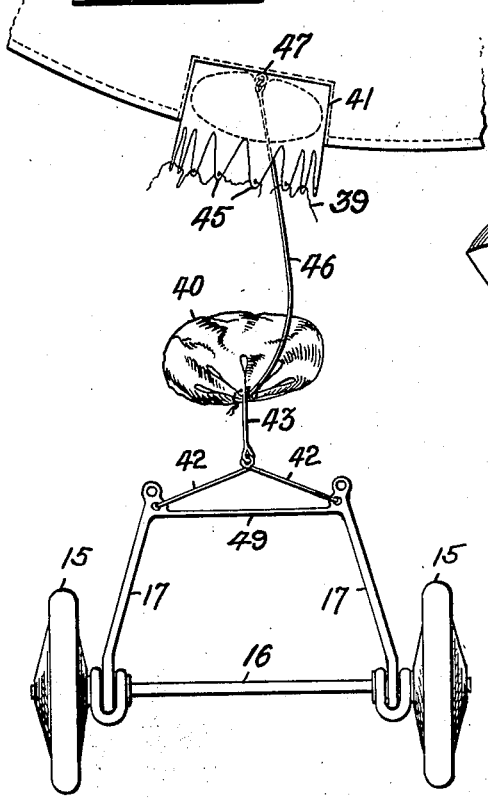
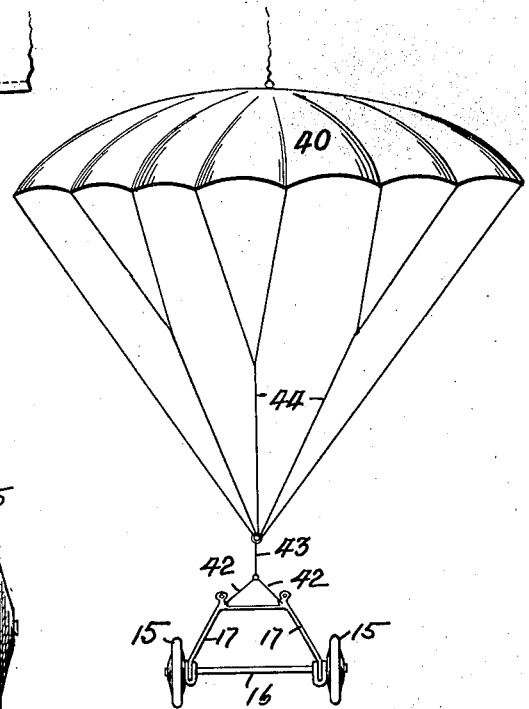
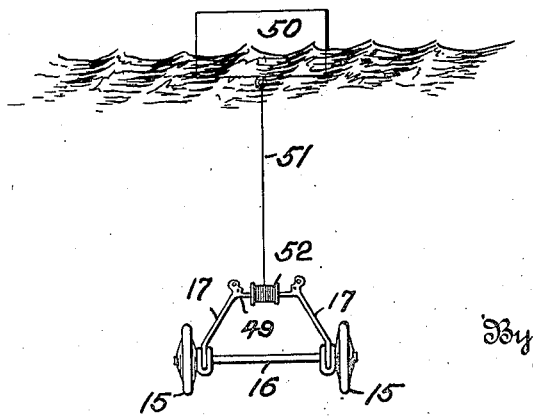

Sept. 6, 1927.                L. B. SPERRY                1,641,700
                                AIRCRAFT
                        Filed Oct. 21, 1922        4 Sheets-Sheet 4

Inventor
LAWRENCE B. SPERRY
By his Attorney
Herbert H. Thompson

Patented Sept. 6, 1927.

1,641,700

UNITED STATES PATENT OFFICE.

LAWRENCE B. SPERRY, OF FARMINGDALE, NEW YORK; THE BANK OF AMERICA, OF NEW YORK, N. Y., AND WINIFRED ALLEN SPERRY, OF HEMPSTEAD, NEW YORK, EXECUTORS OF SAID LAWRENCE B. SPERRY, DECEASED, ASSIGNORS TO WINIFRED ALLEN SPERRY.

AIRCRAFT.

Application filed October 21, 1922. Serial No. 595,920.

This invention relates to aircraft, and has for its principal object the provision of a heavier-than-air flying machine of maximum efficiency in flight, or in rising from or alighting upon land or water.

Further, the invention has for its object the provision of an aircraft having a detachable landing gear whereby an aviator may rid his machine of said gear after rising in the air. The advantages of such construction are many. In the first place, it obviously reduces the weight of the machine by ninety or one hundred pounds and will thus enable an aviator to increase the speed of his machine ten miles an hour or more. Secondly, the air resistance of the machine is lessened by the removal of projecting parts. Thirdly, landing of the machine upon a body of water is greatly facilitated. Heretofore, the landing gear has proven a severe hindrance to the landing of the machine upon water, the landing gear tending to capsize the machine upon striking water. And finally, it may be desirable to land on a more convenient mechanism than wheels, such e. g., as skids, which are effective for traveling over rough ground.

It is a further object of this invention to provide a detachable landing gear, as aforesaid, and means controlled by the aviator whereby the gear may be rapidly and easily released from its attachment to the machine without possibility of jamming.

A further object is the provision of means for preventing too rapid falling of the detached landing gear. This means may take the form of a parachute normally in closed position and carried by said aircraft, but which is adapted to be detached from the aircraft and rendered effective by the falling of the landing gear.

A further object is the provision of means, such as a float, adapted to support the landing gear upon the water and prevent sinking thereof.

When the landing gear is removed from an aircraft, it may be the case that the body of the machine is so low that the propeller, upon landing, may strike the ground in rotating. It is a further object of this invention, therefore, to provide means for stopping the propeller in substantially horizontal position and for maintaining it in said position.

A further object is the provision of landing skids which take the place of the detached landing gear. These skids carry the machine easily over rough ground and are to be preferred in many instances to the wheels of the usual landing gear for the purpose of alighting upon solid, and especially rough, ground.

A further object in employing skids is to prevent the machine from capsizing or turning over on its nose when landing on land, as it is possible to place the skids so far ahead of the center of gravity that nosing over in bad places will be impossible whereas with wheels, it is not possible to put them more than 15 degrees ahead of the center of gravity, and get good results with them.

A further object is the provision of a resilient, shock-absorbing mounting for the landing skids.

Other objects and advantages will in part be obvious and in part be specifically pointed out in the specification.

In the accompanying drawings,

Fig. 1 is a side elevation of an aeroplane embodying one form of my invention.

Fig. 2 is a front elevation thereof with the propeller removed.

Fig. 3 is an enlarged detail view of the landing gear releasing means and the operating mechanism therefor.

Fig. 4 is another view of the landing gear releasing mechanism still further enlarged.

Fig. 5 is a section taken on the line 5—5 of Fig. 7 and showing the skid and skid-supporting means.

Fig. 6 is an enlarged front elevation of the airplane showing the skids.

Fig. 7 is a vertical section taken on the line 7—7 of Fig. 5.

Fig. 8 is a view showing the landing gear at the beginning of its downward flight, after having been detached from the airplane.

Fig. 9 shows the landing gear supported by a parachute.

Fig. 10 is a view showing the detached landing gear with a buoyant member attached thereto for supporting it in the water.

Figure 11:
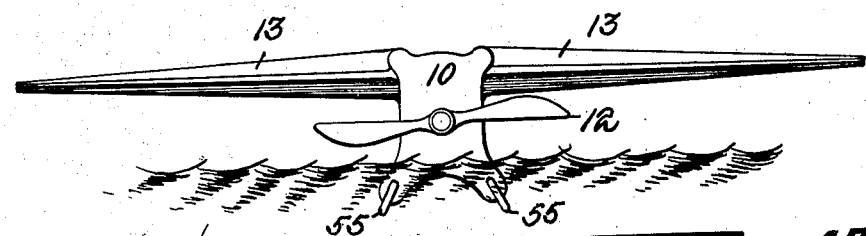
Fig. 11 is a front elevation of the aircraft floating upon a body of water, the propeller being held in substantially horizontal position.
Figure 12:
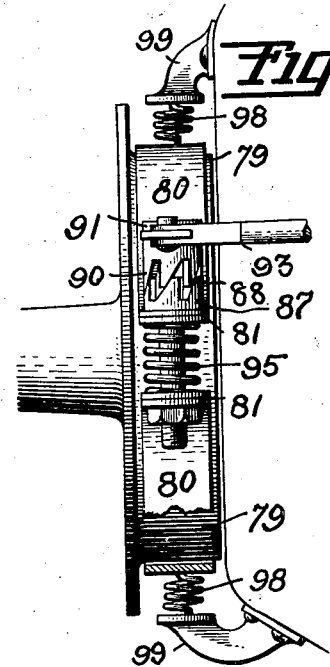
Fig. 12 is a side elevation of a brake operable for holding the propeller shaft in fixed position.
Figure 13:
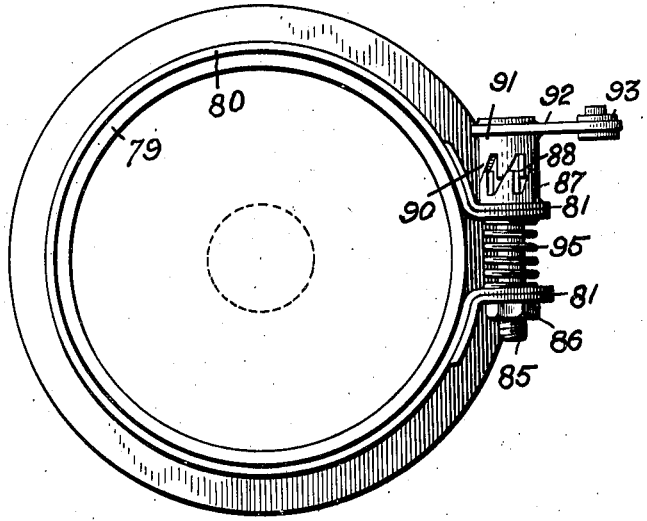
Fig. 13 is a front elevation of the brake shown in Fig. 12.
Figure 14:
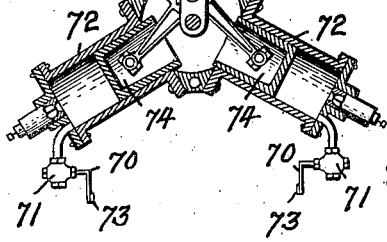
Fig. 14 is a vertical section through the cylinders of an airplane engine showing means for stopping the engine so that the propeller shaft driven thereby occupies a predetermined position.

Referring to the drawings, there is illustrated in Fig. 1 an aircraft 10 of ordinary construction having the usual rudders 11, propeller 12, wings 13 and operator's enclosure 14. The machine is provided with a landing gear comprising a pair of wheels 15 mounted upon an axle 16 supported upon the machine by struts or hangers 17. A pair of struts is shown, in the present case, at each side of the machine.

As hereinbefore stated, it may be desirable to rid the machine of its landing gear after the former has left the ground. For this purpose the gear is detachably connected to the machine, so that it may be disconnected at the will of the operator. One suitable form of connection is illustrated in Figs. 1-4, and comprises a latch 20 slidable in a holder 21 in the form of a track or guideway fixed to the fuselage of the machine. Said latch has a slot 24 cut therein and extending from the bottom edge thereof obliquely upward and then substantially horizontally to form a prong or finger 22 adapted to engage an eye (not shown) near the upper end of a hanger or strut 17. A vertical guide-slot 25 is formed in the track 21 to permit the strut to be raised above the prong 22 so that the latter may pass through the eye in said strut.

Since two struts 17 are provided at each side of the machine, two latches 20 of the same construction but oppositely disposed are provided. To operate the latches to effective (locking) and ineffective (unlocking) positions, the latches 20 may be provided at their inwardly disposed ends with links 30 which may be pivoted at one end upon ears 31 on said latches and at their other end upon opposite ends of a balanced lever 32 fixed upon a shaft 33 journaled in the machine. Said shaft carries also a sprocket wheel 34 over which operates an endless chain 35. The other end of said chain operates over a similar sprocket wheel 36 mounted upon the side of the machine, and a handle 37 is provided to move integrally with said wheel 36. The handle 37 is positioned adjacent the aviator's seat so that he may readily swing handle 37 forwardly or rearwardly to operate lever 32 through the chain and sprocket connection, and hence operate the latches into or out of the apertures in the upper ends of the hangers 17.

The shaft 33 extends through the machine to the other side thereof where the locking mechanism is duplicated so that all of the latches (in the present case) on both sides of the machine are operated simultaneously. It will be apparent that when the lever 32 is in substantial alignment with the links 30, the prongs 22 will project through the struts, but when the handle 37 is operated to rotate lever 32 out of alignment with links 30, the prongs will be withdrawn.

As hereinbefore stated, the slot 24, outwardly from the prong 22, inclines downwardly so as to form a cam surface 36. As the prong 22 leaves the aperture in the upper end of hanger 17, the cam surface 36 comes in contact with the upper edge of said hanger and cams the latter downwardly out of the slot 36. To prevent the hanger from being jammed between the prong 22 (before the latter has left the aperture in the hanger) and the cam 36, the outward tip of the prong may be cut off to form a cam 37 substantially parallel to cam 36. It will thus be apparent that not only are all the hangers released simultaneously, but a positive force is introduced for ejecting them from the holders. All possibility of sticking or jamming of one or more of the struts or hangers in the holders, due to some force such as wind, is thus avoided.

To prevent damage to the landing gear which would ordinarily result from dropping thereof, there may be provided a small parachute 40 normally held in folded position in a stream-line case 41 in the bottom surface of the fuselage. The parachute is connected to the four struts by cords 42 which are in turn connected by a cord 43 to the cords 44 of the parachute. When the landing gear starts to drop, it pulls upon cord 43 and breaks a cord 39 tying together the ends 45 of a bag enclosing the parachute in case 41, permitting the parachute to drop. The ends of the latter are tied together by a light cord 46 having one end fixed to the case at 47. The cord 46 is broken by the fall of the landing gear and parachute, permitting the latter to open. Thereafter the landing gear drops slowly.

A cross-bar 49 is interposed between struts 17 to prevent distortion thereof during the fall of the landing gear. The cords 42 are subjected to a heavy strain during the fall of the landing gear, and if the cross-bar 49 were not provided to hold the struts rigidly in position, there is possibility that the struts on opposite sides of the landing gear would be bent together and rendered useless for co-operation with the latches.

Where the landing gear is to be dropped over water, there may be substituted for the parachute a buoy 50 attached to the landing gear by a cable 51 wound upon a reel 52 which may be mounted upon cross-bar 49.

The reel may be spring-pressed so as normally to wind up the cable. When the buoy 50 strikes the water, the cable will be unwound to the extent where the spring neutralizes the weight of the submerged landing gear.

The usual rubber tires of wheels 15 may serve to float the landing gear upon the water while the parachute attached thereto serves to indicate the position of said gear. In the case where a buoy is used, it may be painted white for the same purpose. It is apparent that both a parachute and a buoy may be employed in some cases.

The purpose of dropping the landing gear may be, as hereinbefore explained, to facilitate alighting of the machine upon water. In this case the body of the machine is constructed as a water-tight unit capable of floating. The usual lower wing may also be dispensed with in this case.

Another purpose of dropping the landing gear is to permit the use of more efficient landing gear upon very rough ground. In the present case skids 55 are employed, since the latter travel easily over very rough ground and permit the machine to be brought to rest in a quarter of the distance usually required when wheels are employed. The skids are shown as operating in channels, slots, or guideways 54 in the fuselage extending from the front end almost to the rear thereof. The skids may be shaped somewhat like the runners of sleighs, and each may comprise an upper member 57 a lower member 58 formed preferably integral with the upper member, and brace rods 59 connecting said members to form a sturdy frame which is the preferred construction of skid. The skids are guided to move substantially parallel to the walls of the channel 54 by means of a plurality of links 60 pivoted at one end at 61 on a wall of the channel and at the other end on an adjacent side of the skid-frame. The relatively long length of links 60 and the small angular distances through which they move insure movement of the skids practically parallel to the walls of the skids. Said movement is resisted by heavy resilient members or rings 64 adapted to engage over arms 65 on the skid-frame and cross-bars 66 on the fuselage. The arms 66 are positioned back of each wall of the channel 54, and arms 65 extend through slots 67 cut in the channel walls so that said arms 65 overlie the respective arms 66, and the resilient bands 64 may engage the respective bands at substantially right angles.

A plurality of such sets of arms 65, 66 and rings 64 are provided throughout the length of the skids and the channel. It will be apparent that upon landing on any portion of the skids, that portion will be pressed upwardly in the channel, thus stretching the resilient members 64. Not only is the shock of landing fully absorbed, but the movement of the skids relative to the machine is resisted to damp the movement and guard the fuselage from injury which might be caused by coming in contact with the ground.

When the machine with the landing gear detached alights upon the water, the watertight body acts as a floating unit, and when the machine lands upon the skids, the body of the machine is so low with respect to the surface of the water and the ground, respectively, that it may be necessary to stop the propeller in horizontal position before alighting. For this purpose there may be provided the device which is more fully described in my co-pending application, Serial No. 581.287, filed August 11. 1922. This device comprises a lever 70 connected to each exhaust valve 71 of the cylinders 72 of an internal combustion engine employed for driving the machine. A linkage 73 is connected to all the valve stems in such manner that when operated by the aviator, certain of said valves are opened and certain valves are closed, the fuel supply to the engine having previously been cut off. This would tend to hold the pistons 74 in the same relative positions within the cylinder every time the linkage was operated, and the propeller is fixed to its shaft to occupy the horizontal position whenever the pistons occupy said relative positions.

To hold the propeller firmly in horizontal position there may be provided a brake comprising a band 80 encircling the hub 79 of the propeller shaft and split at one point in its periphery, the portions of the band adjacent the split being bent off to form flanges 81. A shaft 85 extends through said flanges, said shaft being screw-threaded on its lower end and clamped in position against lower flange 81 by a lock-nut 86. A ratchet-member 87 is fixed upon the upper flange 81 and has teeth 88 meshing with teeth 90 of a ratchet-member 91 journaled on the upper end of shaft 85. Said ratchet-member 91 has an arm 92 fixed thereto to the end of which is pivoted one end of a link 93 having its other end pivotally connected to one end of an operating lever 94 pivoted upon the machine adjacent the aviator's seat. By operating lever or handle 94, the aviator rotates ratchet 91 to cause the teeth 90 thereof to cam downwardly the teeth of ratchet 87 and hence also move the upper flange 81 toward the lower flange 81 (which is fixed relative to ratchet 91) and cause the band to tighten about the hub 79 of the propeller shaft. Movement of the flanges 81 relative to each other is against the action of a spring 95 positioned between and normally tending to separate said flanges. To maintain the band centralized so that all parts thereof are out of contact with the hub 79 when the brake is released, centralizing springs 98 fixed at one end to brackets 99 on the body of the machine and at the other end to said band are provided.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is:

1. In combination, an aircraft having a landing gear, said gear having a plurality of struts, connections between said struts and said aircraft, and means for releasing all of said struts simultaneously to permit detachment of said landing gear.

2. In combination, an aircraft having a landing gear, said gear having a plurality of struts, connections between said struts and said aircraft, means for releasing all of said struts simultaneously to permit detachment of said landing gear and means for ejecting said struts from said aircraft.

3. In combination, an aircraft having a landing gear, said gear having a plurality of struts, connections between said struts and said aircraft, and means for releasing all of said struts simultaneously and ejecting said struts from said aircraft.

4. In combination, an aircraft having a landing gear, said gear having a plurality of struts, connections between said struts and said aircraft, means for releasing all of said struts simultaneously to permit detachment of said landing gear, said means comprising latches engaging said struts, and means for operating said latches simultaneously to ineffective positions.

5. In combination, an aircraft having a landing gear, said gear having a plurality of struts, connections between said struts and said aircraft, means for releasing all of said struts simultaneously and ejecting said struts from said aircraft, said means comprising latches engaging said struts, and means for operating said latches simultaneously to ineffective positions, said latches having cams adapted to engage said struts when said latches are moved to ineffective positions to force said struts out of said machine.

6. In combination, an aircraft having a landing gear, said gear having a plurality of struts, connections between said struts and said aircraft, means for releasing all of said struts simultaneously, and means for ejecting said struts from said aircraft, said means comprising members having cams adapted to engage said struts to force said struts out of the machine.

7. In combination, an aircraft having a landing gear, said gear having a plurality of struts, said aircraft having holders, means in said holders normally engaging said struts, and means operable during flight for rendering said first named means ineffective so as to release said struts.

8. In combination, an aircraft having a landing gear, said gear having a plurality of struts, said aircraft having holders, means in said holders normally engaging said struts, means for rendering said first named means ineffective so as to release said struts, and means for ejecting said struts from said holders after said struts are released.

9. In combination, an aircraft having a landing gear, said gear having a plurality of struts, said aircraft having holders, latches in said holders normally engaging said struts, and means for operating all of said latches simultaneously to release said struts from said holder.

10. In combination, an aircraft having a landing gear, said gear having a plurality of struts, said aircraft having holders, latches in said holders normally engaging said struts, and means for operating all of said latches simultaneously to release said struts, said latches having cams adapted to engage said struts to eject said struts from said holders.

11. In combination, an aircraft having a landing gear, said gear having a plurality of struts, connections between said struts and said aircraft, means for releasing all of said struts simultaneously to permit detachment of said landing gear, said means comprising latches engaging said struts, and means for operating said latches simultaneously to ineffective positions, said last named means comprising a plurality of links connected to said latches, an operating handle, and gearing between said links and handle.

12. In combination, an aircraft having a landing gear, said gear having a plurality of struts, connections between said struts and said aircraft, means for releasing all of said struts simultaneously to permit detachment of said landing gear, said means comprising latches engaging said struts, means for operating said latches simultaneously to ineffective positions, a plurality of links connected to said latches, an operating shaft, connections between said link and shaft whereby rotation of said shaft operates said links to effective and ineffective positions, an operating handle, and gearing between said handle and said shaft.

13. In combination with an aircraft having a propeller shaft, a propeller mounted thereon, means for enabling said aircraft to land upon water including a detachable landing gear, and means for stopping the propeller in substantially horizontal position, a brakeband substantially surrounding said shaft and normally spaced therefrom, and means for clamping said band around said shaft to hold said propeller in substantially horizontal position.

In testimony whereof I have affixed my signature.

LAWRENCE B. SPERRY.